United States Patent Office 3,293,099
Patented Dec. 20, 1966

3,293,099
METHOD OF HEAT SEALING A MATERIAL OF THE TYPE HAVING A THERMOPLASTIC COATING ON EITHER SIDE OF A CARRYING LAYER
Sven Olof Sören Stark, Lund, Sweden, assignor to AB Tetra Pak, Lund, Sweden, a Swedish company
No Drawing. Filed Nov. 21, 1963, Ser. No. 325,470
Claims priority, application Sweden, Nov. 23, 1962, 12,577/62
3 Claims. (Cl. 156—289)

The present invention relates to a method of heat sealing a material of the type having a thermoplastic coating on either side of a carrying layer and where the sealing procedure includes a period of compression by means of clamping jaws of two superposed material layers at the same time as heat is transferred to the compressed zone through at least one of the clamping jaws, whereby the outer thermoplastic coating facing the sealing surface of the clamping jaws as well as the inner thermoplastic coatings facing each other are melted and a material fusion takes place between the two inner coating layers, whereafter a cooling period follows with a solidifying and stabilizing of the melted thermoplastic coatings when the pressure is released and the clamping jaws removed.

Within the modern packing technique one is often faced with problems which may be solved by means of a thermoplastic material or a material with thermoplastic coating which permits sealing by means of heat and pressure. As the thermoplastic materials apart from their heat sealing property often have other qualities which are desirable in the packaging technique, as for instance liquid tightness, grease resistance, etc., it is only natural that these materials are used for a wide range of purposes. In certain cases it is profitable to combine a thermoplastic material with a carrying layer of stiffer material, for example paper, for the purposes of obtaining a combination material possessing the properties of the materials of which it is made up.

It is known to heat seal materials of the type mentioned herein by means of clamping jaws equipped with heat transferring means whereby a quick and reliable sealing is obtained. In cases where the layers required to be sealed only consist of a thermoplastic material a relatively low pressure is used on the clamping jaws, as the thermoplastic material otherwise would deliquesce into a thin film between the heated clamping jaws. If on the other hand a combined material of the previously mentioned type is used a considerably higher pressure of the clamping jaws is required, resulting in an increased heat transfer capacity, as the welding of the inner thermopastic coatings is dependent on heat as well as pressure, and as the heat transferred from one or both of the clamping jaws has to be conveyed through the carrying layer in order to reach the inner thermoplastic layers facing each other.

In accordance with the above it is thus known to heat seal plain as well as combined thermoplastic layers by means of clamping jaws. If, however, a carrying material layer of for instance paper is coated with thermoplastic on both sides difficulties will arise in connection with the sealing as a relatively high pressure and temperature will have to be used on the clamping jaws in order to ensure that the inner thermoplastic layers facing each other are plasticized and welded together. This means, however, that the outer thermoplastic layers facing the clamping jaws are heated above the melting point whereby thermoplastic material will deposit on the surfaces of the clamping jaws when the heat transmission stops and the thermoplastic coating solidifies. The effect of an adhesion like this between the outer thermoplastic layers and the clamping jaws naturally will be that the inner thermoplastic layers, which have been welded together, may be pulled apart when the clamping jaws after completed sealing operation return into their position.

For the purpose of preventing adhesion it is also known to give the clamping jaws a coating of polytetrafluorethylene, known under trade name Teflon. A coating of this type, however, is liable to wear off relatively quickly when subjected to high pressure at high temperature. In addition polytetrafluorethylene is a poor conductor of heat, wherefore a polytetrafluorethylene coating has heavily delaying effect on the sealing process.

These disadvantages are avoided through a procedure in accordance with the present invention which is characterized therein that the heat transferring means of the clamping jaws after the cooling period instantaneously is caused to heat the thermoplastic coatings facing the clamping jaws to the melting point without noticeably heating the inner thermoplastic coatings facing each other thereby jeopardizing the sealing strength, whilst adhesion between the outer thermoplastic coatings and the clamping jaws is prevented when these after completed sealing operations are removed from the sealing zone.

In the following an example of application of the invention is described where the invention is to divide by transverse sealing a paper tube which is thermoplastic coated on the outside as well as on the inside, into individual packages. The problem with tearing of the seams owing to adhesion between the clamping jaws and the outer coating layers is particularly apparent in cases where transverse sealing is effected in planes perpendicular to each other in order to form tetrahedron shaped packages where the sealed edges of material have a natural tendency of splitting, and also because the tube is filled with the product which to some extent will have a cooling effect on the area of sealing and thus hinder the sealing process. In order to achieve a fairly quick sealing operation heating organs with small material masses are used. With a heating organ like this fitted on either of the clamping jaws heat may be transferred in impulses and followed by quick cooling. The procedure, when dividing the mentioned paper tube with two-sided thermoplastic coating, for instance polyethylene, into packages through repeated transverse sealings, is that the clamping jaws are closed whereby the tube is flat-pressed with considerable force whereafter a relatively thin metal band fitted on at least one of the clamping jaws is heated by passing an electric current with high current through the band. By the heat pulse the thermoplastic coating facing the heating jaw as well as the inner thermoplastic coatings facing each other are caused to melt, whereby a material fusion of the inner coatings takes place.

When the current through the metal heating band fitted on at least one of the clamping jaws is broken the heat emission will also stop quickly since the metal band by reason of its inconsiderable material mass has a relatively small heat capacity. Under the cooling period which follows, the melted thermoplastic layers solidify, whereby the layers facing each other will bind together and the thermoplastic coating facing the clamping jaw provided with heat emitting means will owing to the high pressure adhere to the surface of the clamping jaw. If the sealing jaws are removed from the sealing zone immediately after the cooling, the sealing result achieved may be spoilt as at least one of the outer thermoplastic coatings sticks to the surface of the clamping jaw. In order to avoid this adhesion between the clamping jaw and the outer thermoplastic coating an acute electric current is passed through the heating band resulting in a heat pulse which is so adjusted that the thermoplastic coating nearest to the heating jaw will melt, whilst on the other hand the welded inner thermoplastic layers remain intact.

In order to achieve the required effect it is, of course, important to apply the heat pulse at the right moment so that the melting temperature of the plastic is achieved just at the moment when the clamping jaws are removing from the sealing area.

After the adhesion between the outer thermoplastic coating and the clamping jaw operating against it has been eliminated by melting of the coating material, the clamping jaws are removed from the sealing zone without jeopardizing the sealing of the inner thermoplastic layers.

In certain cases some thermoplastic material may deposit on the heated surface of the clamping jaw when the clamping is separated from the thermoplastic layer pressed against its surface. An excessive deposit of material on the surface of the clamping jaw will naturally cause impaired heat transfer from the clamping jaw to the sealing layer and thereby an inferior sealing result, wherefore, after the sealing operation and when the clamping jaws are separated from the sealing object, it is advisable to again intensely heat the surface of the clamping jaw by electricity so that the thermoplastic material deposited thereon is burnt or at least so chemically changed that it looses its effect of adhesion. This latter application of heat may naturally be either a continuation of and an intensification of the release heat pulse or it may be a separate intense heat pulse applied after the clamping jaws have been removed from the object of sealing.

The timing of the heat pulses mentioned herein as well as the regulation of their intensity may be achieved for instance by adjustable cam discs fitted on the drive and control mechanism of the clamping jaws.

I claim:

1. Method of heat sealing a material having a thermoplastic coating on both sides of a body layer which comprises compressing and heating an area of superposed layers of said material by means of a pair of cooperating clamping jaws provided with heat emitting means whereby the thermoplastic coatings facing each other and the thermoplastic coating facing said clamping jaws are melted, cooling said thermoplastic coatings in said area whereby said coatings are solidified and stabilized, energizing said heat emitting means practically instantaneously sufficiently to melt the thermoplastic coating facing said clamping jaws thereby preventing adhesion between said thermoplastic coating and said clamping jaws, releasing the pressure on said clamping jaws and separating them from said superposed layers.

2. Method in accordance with claim 1 in which the clamping jaws are heated during the release of pressure and the following removal of the clamping jaws from said area for a sufficiently long period and with sufficient intensity to ensure that the thermoplastic material which may have deposited on the sealing surfaces of the clamping jaws is burnt or completely decomposed.

3. Method in accordance with claim 1 in which the clamping jaws after completion of the sealing operation and removal from the sealing area again are heated for the purpose of cleaning the sealing surfaces of the clamping jaws through burning or chemically decomposing any deposit of thermoplastic material thereon.

No references cited.

EARL M. BERGERT, *Primary Examiner.*

D. J. DRUMMOND, *Assistant Examiner.*